E. WHITELEY.
Domestic Boiler.
No. 14,622.
Patented April 8, 1856.
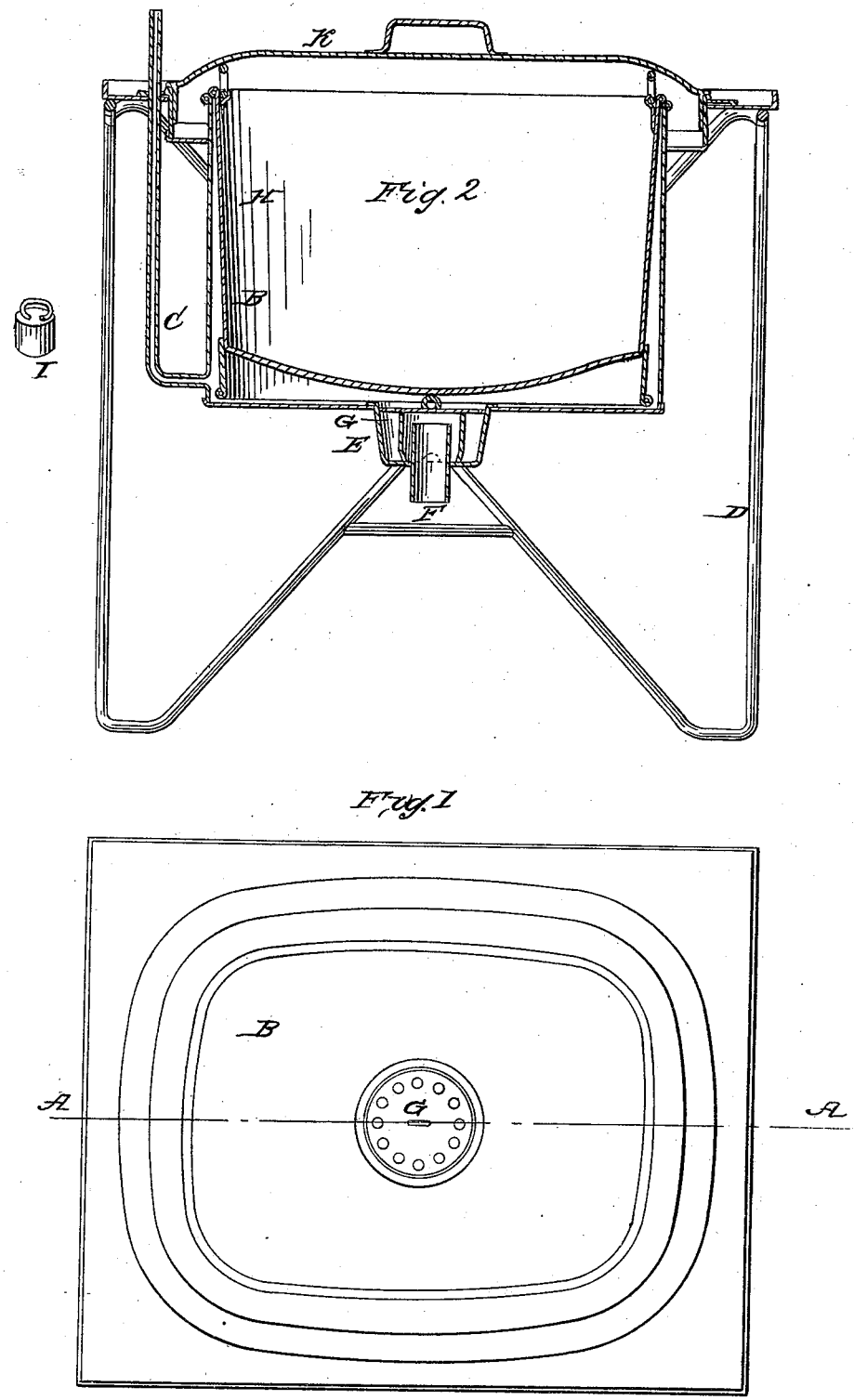

UNITED STATES PATENT OFFICE.

EDWARD WHITELEY, OF BOSTON, MASSACHUSETTS.

BOILER FOR COOKING BY STEAM.

Specification of Letters Patent No. 14,622, dated April 8, 1856.

*To all whom it may concern:*

Be it known that I, EDWARD WHITELEY, of Boston, in the county of Suffolk and State of Massachusetts, have invented certain new and useful Improvements in Boilers for Steaming Vegetables and other Purposes, of which the following is a full, clear, and exact description, reference being had to the accompanying drawings, making part of this specification, in which—

Figure 1 is a plan with the cover removed. Fig. 2, a section upon the line A, A, of Fig. 1 the cover being in place.

The object of my invention is to produce a boiler which may be employed at will either as a steamer or a boiler, the cooking in each case being effected by means of steam.

In the accompanying drawings B, is the vessel into which steam is admitted from a suitable boiler through the pipe C; this vessel is supported permanently upon the stand D, or in any other suitable manner.

E, is a depression in the bottom of the vessel B, into which rises the tube F, the top of which is surrounded by and covered with the cap G, thus forming a "trap" which permits the water of condensation to pass but not the steam. Within the vessel B, is the interior vessel H, which contains the articles to be cooked. For vegetables, this vessel is perforated to admit the steam, if it be used as a boiler it is made without perforations, and may then be used for making soup or for cooking meats, or other articles requiring to be boiled in water.

When the boiler is to be used simply for the purpose of heating water, the interior vessel may be removed, and the water heated by the introduction of steam directly thereto. In such case the trap G is removed and the pipe F, is closed by the cap I. The steam is prevented from escaping by the cover K the flange of which sets into a trough surrounding the boiler, which is filled with water.

What I claim as my invention and desire to secure by Letters Patent is—

The trap G, and cap I, as arranged and applied to the vessel B, whereby the latter may be employed either as a boiler or steamer as set forth.

E. WHITELEY.

Witnesses:
SAM. COOPER,
P. E. TESCHEMACHER.